(12) United States Patent
Silverstein et al.

(10) Patent No.: US 7,733,568 B2
(45) Date of Patent: Jun. 8, 2010

(54) RETROREFLECTIVE OPTICAL COLLIMATION LAYER AND DISPLAY DEVICES INCORPORATING SAME

(75) Inventors: Louis Silverstein, Scottsdale, AZ (US); Lorne A. Whitehead, Vancouver (CA); Gregory John Ward, Albany, CA (US); Helge Seetzen, Vancouver (CA); Vincent Kwong, Vancouver (CA); Gary E. Thomas, Eindhoven (NL)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 155 days.

(21) Appl. No.: 12/021,214

(22) Filed: Jan. 28, 2008

(65) Prior Publication Data

US 2009/0190237 A1 Jul. 30, 2009

(51) Int. Cl.
*G02B 27/10* (2006.01)
(52) U.S. Cl. ....................................... 359/619
(58) Field of Classification Search ......... 359/619–627, 359/599, 530
See application file for complete search history.

(56) References Cited

U.S. PATENT DOCUMENTS

| 5,781,344 | A | 7/1998 | Vance |
| 6,697,042 | B1 | 2/2004 | Cohen et al. |
| 6,911,772 | B2 | 6/2005 | Cok |
| 6,985,272 | B2 | 1/2006 | Bridgwater et al. |
| 7,142,179 | B2 | 11/2006 | Miller et al. |
| 7,250,722 | B2 | 7/2007 | Cok et al. |
| 7,322,732 | B2 | 1/2008 | Negley et al. |
| 2003/0002159 | A1* | 1/2003 | Osawa et al. ............ 359/619 |
| 2006/0187552 | A1* | 8/2006 | Huang et al. ............ 359/619 |
| 2007/0076406 | A1 | 4/2007 | Kodama et al. |

FOREIGN PATENT DOCUMENTS

| EP | 0825579 A1 | 2/1998 |
| JP | 06313813 A | 11/1994 |
| JP | 2000171614 A | 6/2000 |
| JP | 2000258760 A | 9/2000 |
| JP | 2000275422 A | 10/2000 |
| JP | 2003005165 A | 1/2003 |
| JP | 2003329825 A | 11/2003 |
| JP | 2004020826 A | 1/2004 |
| JP | 2004029837 A | 1/2004 |
| JP | 2005128352 A | 5/2005 |
| JP | 2005283979 A | 10/2005 |
| JP | 2006309150 A | 11/2006 |
| JP | 2007078958 A | 3/2007 |
| WO | 2006/071494 A1 | 7/2006 |

* cited by examiner

*Primary Examiner*—Alicia M Harrington

(57) ABSTRACT

A display comprises a backlight comprising a plurality of individually-controllable light emitters, a light modulator comprising a plurality of individually-controllable elements, and, a retro-reflective optical layer positioned between the backlight and the light modulator. The retro-reflective optical layer is configured to pass light incident thereon at an angle with respect to a normal to the retro-reflective optical layer of less than a threshold angle $\phi$, and reflect light incident thereon at an angle with respect to a normal to the retro-reflective optical layer of greater than $\phi$ in a direction opposite and generally parallel to an incoming direction of incident light.

40 Claims, 4 Drawing Sheets

RETROREFLECTIVE OPTICAL COLLIMATION LAYER AND DISPLAY DEVICES INCORPORATING SAME

TECHNICAL FIELD

The invention relates to optical layers. Embodiments of the invention have application in backlit electronic displays such as computer displays, television displays and the like. This invention also relates to electronic displays incorporating layers as described herein.

BACKGROUND

Displays of the type having a backlight illuminating a light modulator are sometimes susceptible to parallax. Parallax effects can cause apparent distortions of a desired image when the displays are viewed from different angles.

Various types of optical layers are described in the following references:
- U.S. Pat. No. 5,781,344 (Vance)
- JP 06313813 A (Maeda)
- JP 2000171614 A (Kin et al.)
- JP 2000258760 A (Ono et al.)
- JP 2000275422 A (Nomura et al.)
- JP 2003005165 A (Maeda et al.)
- JP 2003329825 A (Sekiguchi)
- JP 2004020826 A (Sekiguchi)
- JP 2004029837 A (Iino)
- JP 2005128352 A (Ishii)
- JP 2005283979 A (Tomono et al.)
- JP 2006309150 A (Honda et al.)
- JP 2007078958 A (Shibazaki et al.)

The inventors have determined a need for improved optical layers and displays incorporating such layers.

SUMMARY OF THE INVENTION

One aspect of the invention provides a display comprising a backlight comprising a plurality of individually-controllable light emitters, a light modulator comprising a plurality of individually-controllable elements; and, a retro-reflective optical layer positioned between the backlight and the light modulator, the retro-reflective optical layer configured to pass light incident thereon at an angle with respect to a normal to the retro-reflective optical layer of less than a threshold angle $\phi$, and reflect light incident thereon at an angle with respect to a normal to the retro-reflective optical layer of greater than $\phi$ in a direction opposite and generally parallel to an incoming direction of incident light.

Another aspect of the invention provides a retro-reflecting optical layer comprising a single-layer array of lenses embedded in a matrix, a front side defining optically-transmissive apertures on-axis with the lenses, a rear side on which the lenses are exposed to receive incident light, and, light-reflecting zones located off-axis and adjacent the lenses, the light-reflecting zones configured to reflect light incident thereon back into the lenses.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
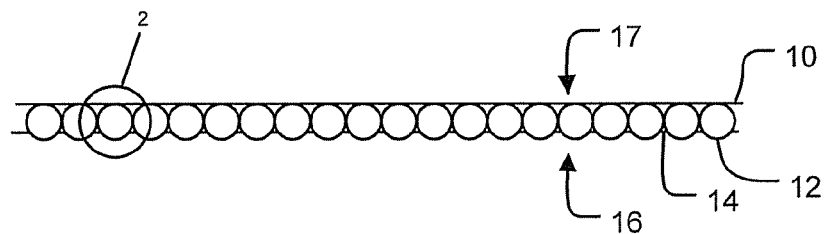
FIG. 1 is a diagram showing a cross section through a portion of an optical layer according to an embodiment of the invention.

This invention relates to optical layers. FIG. 1 shows a layer 10 according to an example embodiment. Layer 10 comprises a large number of small lenses 12. Lenses 12 have an index of refraction different from that of a medium surrounding layer 10 through which light can enter or leave lenses 12.

In the illustrated embodiment, lenses 12 are supported in a matrix 14. Matrix 14 may comprise any suitable binding agent. In alternative embodiments, lenses 12 may be held in place by attachment to a sheet, one another, or an alternative support structure.

On a rear side 16 of layer 10 lenses 12 are exposed so that light incident on rear side 16 can enter lenses 12. A front side 17 of layer 10 has areas 20 through which light can pass. Areas 20 are aligned with lenses 12.

Reflective regions 22 (see FIG. 2A) are located around lenses 12. Light that encounters the edge of a lens 12 in a reflective region 22 is reflected back into lens 12.

Figure 2:
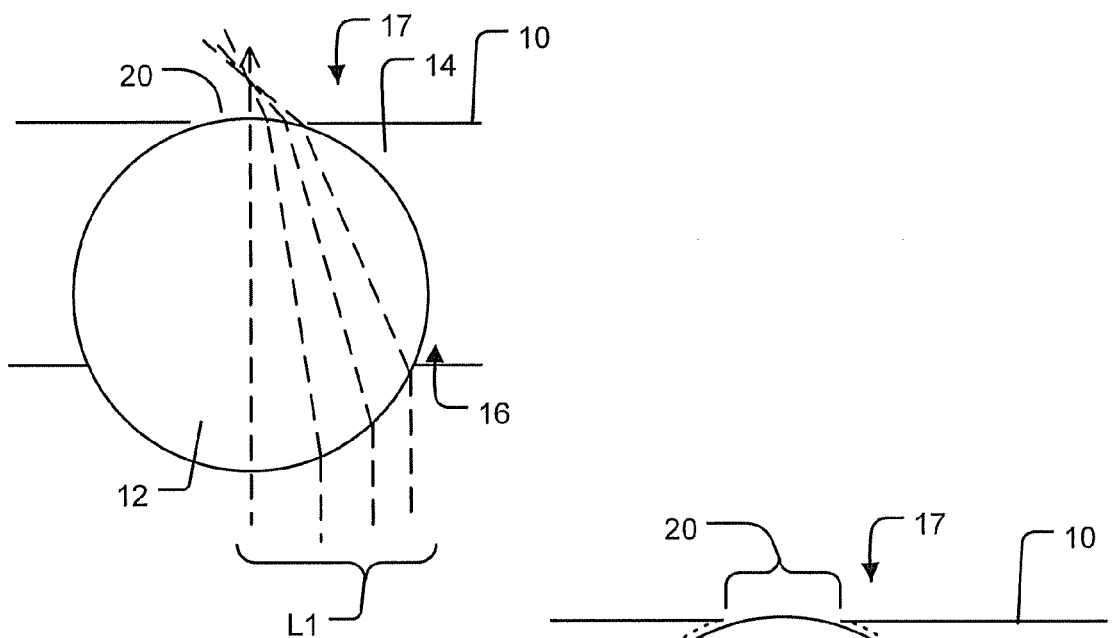
FIG. 2 is an expanded view of a part of the layer of FIG. 1 showing light rays incident normally on a rear face of the layer passing through the layer.

As shown in FIG. 2, light L1 that is incident normal to layer 10 enters a lens 12, is focussed by the lens 12 and passes through the area 20 corresponding to the lens 12 so that it emerges from front side 17 of layer 10.

Figure 2A:
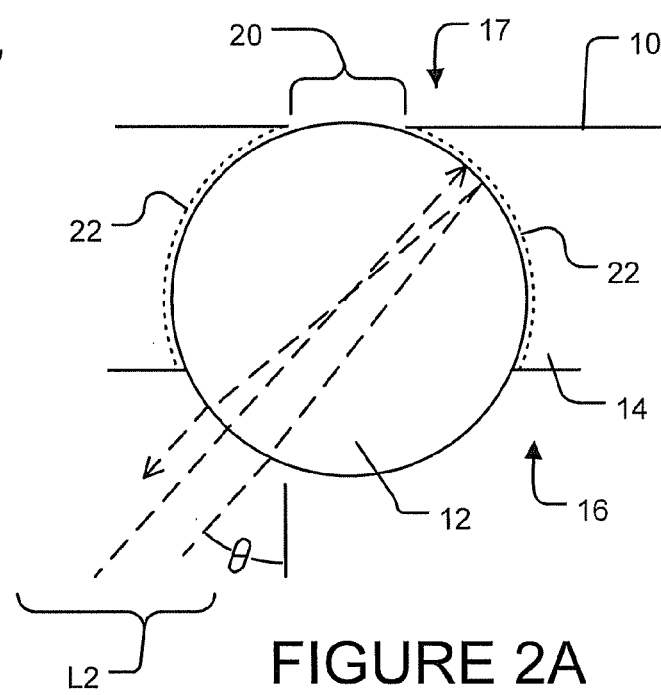
FIG. 2A is an expanded view of a part of the layer of FIG. 1 showing light rays incident on a rear face of the layer at an angle being retro-reflected.

As shown in FIG. 2A, light L2 incident on layer 10 at an angle θ to the normal that is larger than a threshold angle, $\phi$, does not pass through area 20. Instead, light L2 encounters reflective region 22 and is reflected back to back side 16 in more-or-less the same direction from which it was incident. Thus, for light incident on back side 16 of layer 10 at angles θ greater than the threshold angle, $\phi$, layer 10 behaves as a retro-reflector. In example embodiments, $\phi$ is in the range of 15 degrees to 25 degrees. For example, $\phi$ is about 20 degrees in some embodiments. Light emitted toward layer 10 within a cone that is centered on an axis normal to layer 10 and has a half-angle of $\phi$ will pass through layer 10.

In some embodiments, a majority of light incident on back side 16 may be within a collimation angle $\beta$ of a normal to back side 16. In such embodiments, layer 10 may be configured such that $\phi$ is less than or equal to $\beta$.

As shown in FIG. 2B, lenses 12 increase the spread of light that passes through lenses 12. FIG. 2B shows light rays L3 that are incident on a lens 12 at angles +ϕ and −ϕ. Light rays L3 pass through lens 12 and area 20. When light rays L3 emerge from layer 10 they are at angles +ψ and −ψ to the normal to layer 10 where ψ>ϕ. In some embodiments, ψ is in the range of 85 to 90 degrees.

Figure 4:
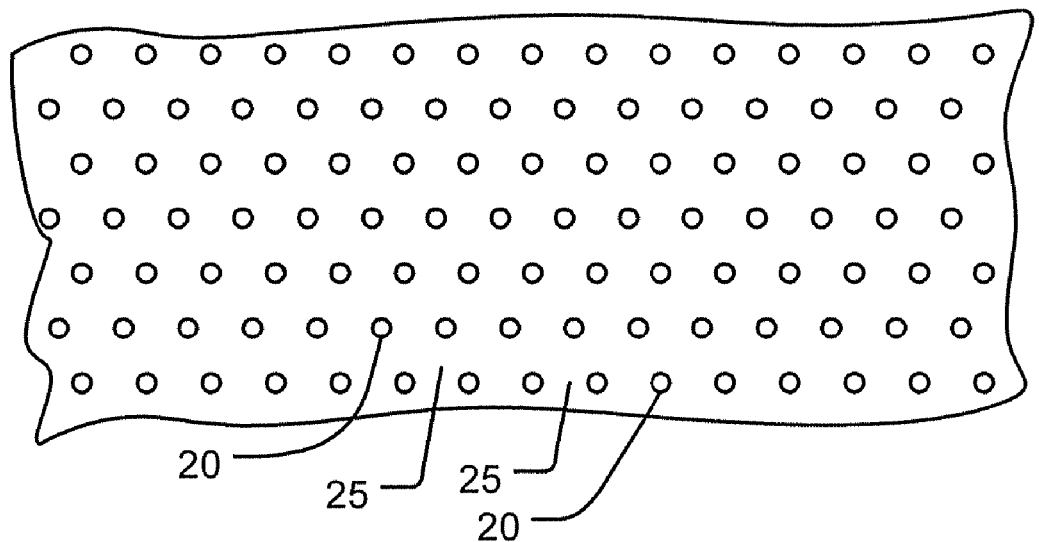
FIG. 4 shows a front side of the layer of FIG. 3.

Areas 25 (see FIG. 4) of front side 17 between areas 20 are reflective in some embodiments. In some embodiments, at least 80% to 95% of the surface area of front side 17 is reflective. The reflective parts of front side 17 may be specular reflectors, diffuse reflectors, mixed reflectors with partial specularity or some combination of specular, diffuse and/or mixed reflectors. Areas 27 (see FIG. 4) on rear side 16 between lenses 12 may also be reflective in some embodiments.

In some embodiments, a layer of reflective material applied to front side 17 provides both a reflective front-facing surface between areas 20 and contacts lenses 12 to provide reflective regions 22.

There are a variety of ways in which the construction of the layer 10 shown in FIG. 1 can be varied. These include, without limitation:
the shapes and sizes of lenses 12;
the arrangement of lenses 12 in the plane of layer 10;
the sizes of areas 20;
the way in which areas 20 are provided; and,
the way in which reflective areas 22 are provided.

It is not critical that lenses 12 have shapes which focus incident light sharply at focal points. Lenses 12 may depart from ideal lens shapes. Lenses 12 may, for example, be spherical. In alternative embodiments, lenses 12 are ellipsoidal, hemispherical or have the form of parabolic concentrators. In some embodiments, lenses 12 have sizes (diameters for spherical lenses 12) on the order of microns. In an example embodiment, lenses 12 have diameters of about 50 μm or less. In some embodiments, lenses 12 are larger. In some embodiments, lenses 12 comprise spherical beads.

Lenses 12 may be made of any suitably transparent material having an index of refraction sufficient, in combination with the shape of lenses 12, to collect light incident in an input range of angles and to direct the collected light through areas 20 so that the collected light emerges on the front side of layer 10. Lenses 12 may be made, for example, from glass, or suitable plastics such as poly-para-xylylenes (e.g. Parylene).

Figure 3:
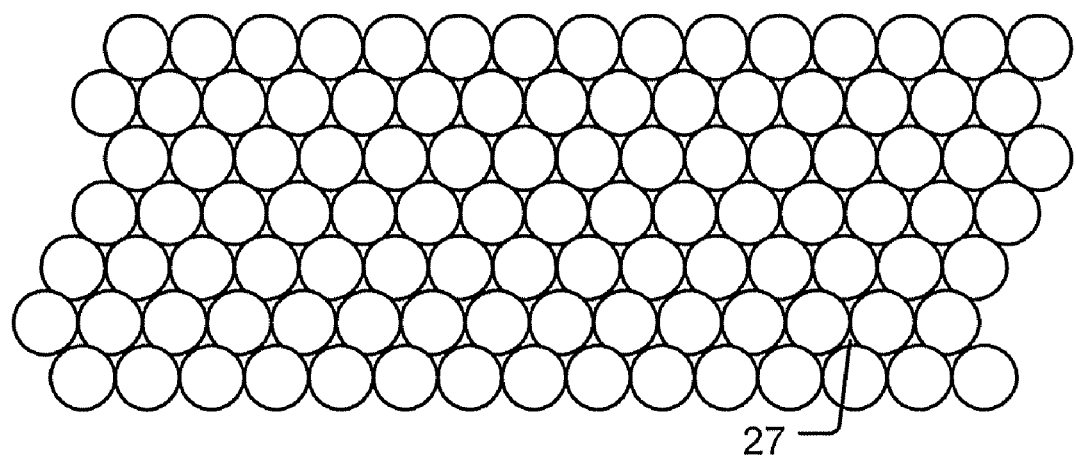
FIG. 3 shows one possible arrangement of lenses in a layer as seen from a rear side of the layer.

Lenses 12 may be arranged in any suitable manner in the plane of layer 10. It is advantageous in some embodiments to have a high density of lenses 12 such that most light incident on rear side 16 of layer 10 can enter a lens 12. Lenses 12 may, for example, be closely packed in a hexagonal array as shown, for example, in FIG. 3.

Areas 20 may make up a relatively small area of front side 17. In some embodiments, areas 20 collectively make up 5% to 20% of the area of front side 17. Areas 20 are round pinholes in some embodiments. In some embodiments where lenses 12 are spherical or nearly spherical (i.e. are spheroidal) the pinholes have diameters in the range of 5% to 20% of the diameters of lenses 12.

Areas 20 may be provided by portions of matrix 14 which are transparent or missing. In some embodiments, areas 20 constitute places where matrix 14 is very thin and permits suitably-directed light to pass from lens 12 through onto the front side 17 of layer 10. In some embodiments, areas 20 are pinholes in an opaque coating or layer on the front side 17 of layer 10. Areas 20 may be spaced from lenses 12 in some embodiments.

In some embodiments, areas 20 comprise locations at which lenses 12 project through matrix 14. In such embodiments, the size of areas 20 is dependent on the amount by which lenses 12 project beyond matrix 14 on front face 17 of layer 10. In an example embodiment, lenses 12 are spherical beads which project by a distance in the range of 0.02 to 0.05 times the diameter of lenses 12. For example, lenses 12 may be 1 mm diameter spheres which project by 0.03 mm on front side 17.

Each area 20 is smaller in area than the area over which the corresponding lens 12 collects light on the rear side of layer 10. In some embodiments, the ratio of the combined area of lenses 12 exposed on rear side 16 of layer 10 to the combined area of areas 20 is at least 4:1. For example, this ratio may be in the range of 4:1 to 20:1.

In typical embodiments, areas 20 are on-axis with lenses 12 in the sense that they pass light that is incident normally to layer 10 from rear side 16. The term "on-axis" is used herein to refer to an axis extending through the center of a lens 12 in a direction generally normal to layer 10. Reflective areas 22 are adjacent to areas 20 but are off-axis.

Reflective areas 22 may be provided by making matrix 14 of a light-reflecting material. For example, in some embodiments matrix 14 may be constructed from a specularly reflective material. In other embodiments, matrix 14 or lenses 12 may be coated with a specularly reflective coating or layer in reflective areas 22.

In some embodiments, reflective areas 22 may not be completely specular. For example, reflective areas 22 may comprise partially specular reflectors.

Matrix 14 may comprise a suitable binder. Matrix 14 may, for example, be reflective, absorptive or transparent. In embodiments where matrix 14 is absorptive or transparent, a reflective surface coating may be applied to matrix 14 in the region of areas 22. In some embodiments matrix 14 may comprise, for example a transparent plastic material, of which acrylic polycarbon variants, thermosets and thermoplastics are some specific examples.

A layer having an arrangement of lenses 12 as described herein may be made by various suitable manufacturing processes. For example:
Lenses 12 may be pressed into or otherwise embedded into a layer of suitable binder material;
Lenses 12 may be arranged on a surface or in a mold and a suitable binder material may be applied, for example by spraying;
Reflective areas 22 may be applied to exposed parts of lenses 12 by spraying, sputtering, vacuum evaporation, or other suitable processes.
Areas 20 may be formed by applying masking material at locations where areas 20 are required, applying a material to provide reflective areas 22 and/or matrix 14 and then removing the masking material.

Figure 5:
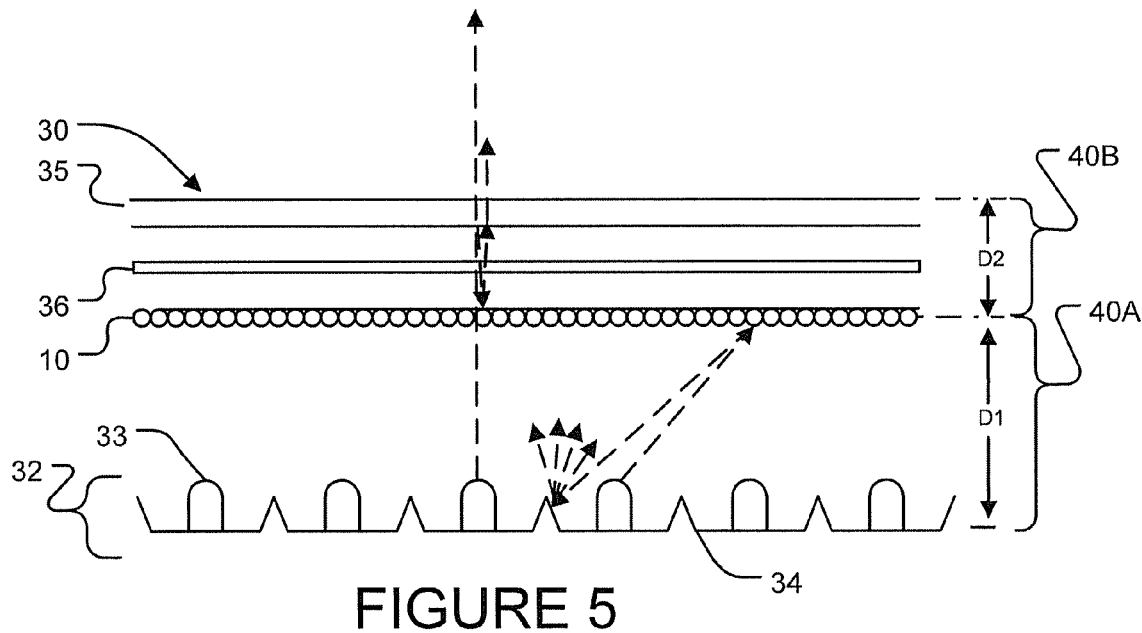
FIG. 5 shows a display incorporating a layer like that of FIG. 1.

FIG. 5 is a schematic cross section of a display 30 comprising a layer 10. Display 30 comprises a backlight 32. The light output in different areas of backlight 32 is independently controllable. Backlight 32 may, for example, comprise:
an array of light sources that are controllable individually or in localized groups;
a plasma display in which the light output in different areas can be independently controlled; or
the like.

In the embodiment of FIG. 5, backlight 32 comprises an array of light-emitting diodes (LEDs) 33.

In embodiments, a reflective back plate 34 is provided behind light emitters (e.g. diodes) 33. Reflective backplate 34 assists in recycling light that does not pass immediately through layer 10. In cases where such recycling is not required, backplate 34 may be omitted. Back plate 34 can have different structures in alternative embodiments. In some embodiments, back plate 34 is retroreflective. In some embodiments, backplate 34 is a member having a generally planar reflective surface. The reflective surface may be a specular reflector but this is not mandatory. The reflective surface may be a diffuse reflector.

In the illustrated embodiment, diodes 33 are located in shallow depressions in a reflective back-plate 34. Back-plate 34 is preferably of a material that scatters light incident on it. For example, back-plate 34 may have a white surface. It is advantageous for back-plate 34 to be a diffuse reflector in some embodiments. Back-plate 34 may have a matte surface, for example. In other embodiments, back-plate 34 may be a specular or partially specular reflector.

Figure 6:
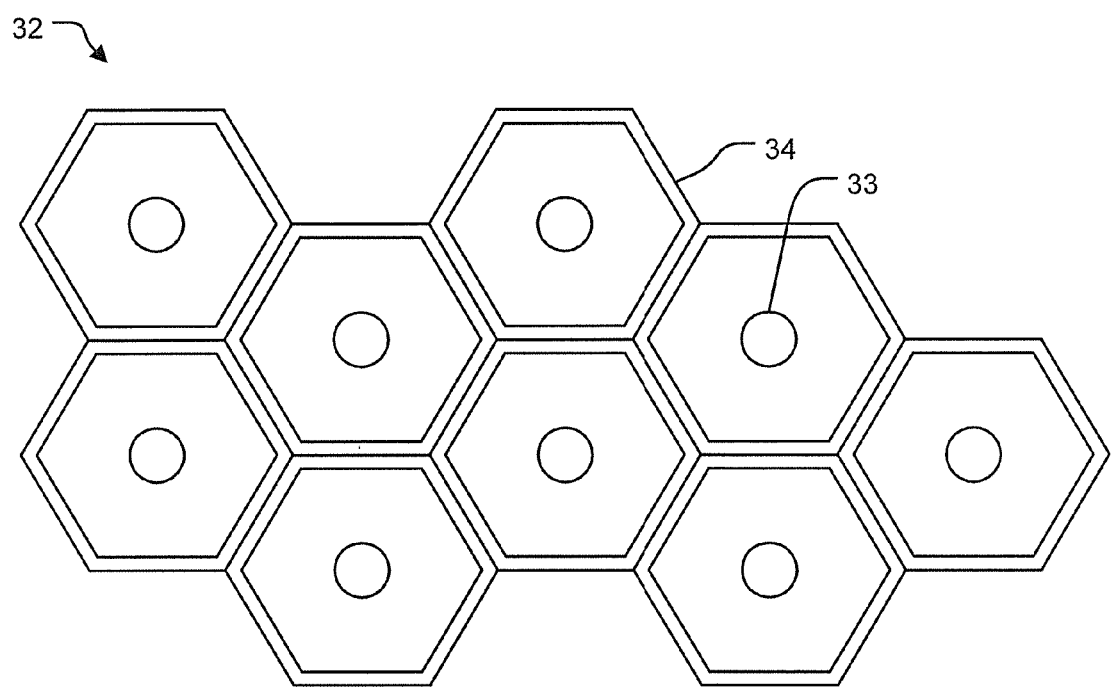
FIG. 6 shows an example configuration for a backlight.

FIG. 6 is a plan view of an example configuration for back-plate 34. In the embodiment of FIG. 6, back-plate 34 comprises ridges 34A that extend around LEDs 33 or other light sources of backlight 32. In the illustrated embodiment, ridges 34A form closely packed hexagons that extend around LEDs 33. In other embodiments, back-plate 34 is flat, has curved concave or convex features etc. In some embodiments, back-plate 34 comprises a reflective layer (for example, a multi-layer optical film MOF of the type available from 3M Optical Systems Division of St. Paul Minn., USA ("3M")). These layers all can reflect light incident on them back toward layer 10 which, in turn, reflects and refracts the light back toward modulator 35.

Backlight 32 may comprise a forward-refracting lenses or parabolic reflectors to collimate and direct the emitted light toward layer 10. Reflectors may be incorporated in back-plate 34 or LEDs 33. Lenses may be incorporated in LEDs 33 or provided in a separate structure, for example.

Efficiency can be gained by selecting LEDs 33 or other light emitters of backlight 32 such that light is preferentially emitted in the range of angles that can pass though layer 10. For example, LEDs 33 may emit preferentially in a cone having a half-angle of 20 degrees. LEDs 33 are spaced closely enough that there are not dark spots in which an adequate light intensity cannot be reached between LEDS 33. In some embodiments LEDs 33 have large light emitting areas. For example, LEDs 33 in such embodiments may comprise side-emitting LEDs having a 'batwing' emission profile, coupled with a suitable forward light-guiding system.

Light from backlight 32 can pass through layer 10 to a transmission-type modulator 35 such as an LCD panel. In the embodiment illustrated in FIG. 5, a quarter-wave plate 36 is located between layer 10 and modulator 35.

Quarter-wave plate 36 may alter the polarization of light passing therethrough. In some embodiments, quarter-wave plate 36 converts circularly-polarized light incident thereon into linearly-polarized light exiting therefrom, and conversely converts linearly-polarized light incident thereon into circularly-polarized light exiting therefrom.

When display 30 is operating, LEDs 33 are driven to emit light. Different LEDs 33 are driven to emit different amounts of light. Light emitted directly toward layer 10 by any LED 33 will pass through the layer 10 (except for the relatively small proportion of the light that hits areas 27). Light that is emitted from LEDs 33 at an angle that is within $\pm \phi$ to the normal to layer 10 is also passed through layer 10. Light that hits areas 27 is reflected back toward backlight 32. Light that is emitted from LEDs 33 toward modulator 35 at an angle to the normal to layer 10 that is greater than $\phi$ is retro-reflected. A significant proportion of the retro-reflected light is recycled by being reflected back toward layer 10 by reflective back-plate 34. Light that is emitted by an LED 33 toward back-plate 34 is reflected at back-plate 34 toward layer 10.

Light that passes through layer 10 reaches modulator 35. Circularly-polarized light passing through layer 10 is converted to linearly-polarized light by quarter-wave plate 36. Where modulator 35 is of a type which passes light only of a specific polarization (as is the case for typical LCD panels), light having a polarization matching that of the panel passes through the panel (and is controllably attenuated as it does so). Light having a polarization not matching that of the panel is reflected by the panel.

The light reflected by the panel passes through quarter-wave plate 36, which converts the light from linearly-polarized light to circularly-polarized light. The circularly-polarized light is reflected off of front face 17 of layer 10. The reflection reverses the 'handedness' of the circular polarization. The light reflected off areas 25 of front side 17 of layer 10 passes again through quarter-wave plate 36 which converts the circularly polarized light back to linearly polarized light. The polarization of the light has been rotated by 90 degrees and now matches that of modulator 35. The light therefore passes through modulator 35 (where it can be controllably attenuated).

In embodiments which include a quarter-wave plate, as shown, it is desirable that the front face 17 of layer 10 provide a specular reflector and also that there be no bulk diffuser located between modulator 35 and layer 10 since a bulk diffuser will randomize the polarization of light with which it interacts. Eliminating a bulk diffuser can improve the overall optical efficiency of display 30 (since a diffuser can absorb a significant fraction of the light that passes through it).

In some embodiments, modulator 35 comprises an LCD layer 35A, a diffuser 35B, as well as one or more light-recycling layers such as a reflective polarizer 35C (for example a Vikuiti™ dual brightness enhancement film DBEF-D550 available from 3-M Optical Systems Division of St. Paul, Minn., USA) and a viewing angle optimization sheet 35D (for example a Vikuiti™ brightness enhancement film BEF-III-10T available from 3-M Optical Systems Division of St. Paul, Minn., USA).

The embodiment shown in FIG. 5 can therefore be efficient in the use of light emitted by LEDs 33.

In the embodiment shown in FIG. 5, the retroreflective nature of layer 10 helps to prevent light originating in an area where LEDs 33 are bright from being reflected or scattered off of layer 10 into an area where LEDs 33 are dimmer. At the same time, the arrangement of layer 10 and reflective back-plate 34 allows light that is emitted from LEDs 33 at angles for which the light does not pass through layer 33 to be recycled.

In the embodiment of FIG. 5, the light incident on modulator 35 appears to originate from layer 10. For a given distance between backlight 32 and modulator 35 the presence of layer 10 reduces the parallax error (i.e. the apparent shift with changes in viewing angle of the relative positions of the pixels of modulator 35 and the light sources that illuminate those pixels).

In the embodiment described above, layer 10 divides the region between backlight 32 and modulator 35 into two distinct optical cavities, a rear cavity 40A and a front cavity 40B. The small size of areas 20 relative to the area of front face 17 of layer 10 means that there is little transmission of light from front cavity 40B to rear cavity 40A. The retro-reflective property of layer 10, when viewed from the rear, prevents deliberate variations in light intensity from becoming too blurred or diffused by scattering within rear cavity 40A. The 'one-way' property of layer 10 provides separation between optical cavities 40A and 40B.

In preferred embodiments, front optical cavity 40B is significantly thinner than rear optical cavity 40A. In FIG. 5, D1 is the thickness of rear optical cavity 40A and D2 is the thickness of front optical cavity 40B. In some embodiments D1 is on the order of millimeters to tens of millimeters and D2 is on the order of microns.

The display of FIG. 5 can be operated according to a method which involves:

operating backlight 32 to emit light such that the intensity of the emitted light varies from location-to-location on backlight 32;

allowing the emitted light to reflect off of layer 10 and backlight 32 to achieve a spatially non-uniform light distribution within rear optical cavity 40A;

allowing at least some light from rear optical cavity 40A that has an angle of incidence onto layer 10 equal to or less than ±φ of the normal to layer 10 to pass through layer 10 while retroreflecting light from rear optical cavity 40A that has an angle of incidence onto layer 10 exceeding ±φ;

allowing light that has passed through layer 10 to reflect between modulator 35 and front side 17 of layer 10 to achieve a spatially-varying light distribution within front cavity 40B;

setting at least some pixels of modulator 35 to pass selected proportions of light incident on the pixels from front cavity 40B and allowing at least some light from front cavity 40B to pass through those pixels of modulator 35.

In some embodiments, the method involves, estimating the intensity of light incident on the pixels by applying a transfer function, which comprises a computational model of the optical properties of layer 10 to light emitted by backlight 32. Where backlight 32 comprises a plurality of discrete light emitters then the transfer function may be applied to a measured or estimated light output of each of the plurality of light emitters. Estimating the intensity of light incident on the pixels may be performed in a controller. In some embodiments the controller comprises one or more data processors that execute software instructions. The software instructions may be recorded on a medium so that they are accessible to the data processor(s). The software instructions cause the data processors to estimate the intensity of light incident on the pixels. In other embodiments, some or all parts of the estimation may be performed by logic circuits (which may be implemented by hard-wired circuits, application specific integrated circuits, configured field programmable gate arrays, or the like).

In some embodiments, operating backlight 32 to emit light comprises obtaining driving values for individual light emitters, groups of light emitters or locations in backlight 32 by a process comprising applying a low-pass spatial filter to the image data, downsampling the image data, or otherwise reducing a spatial resolution of the image data. The driving values can then be applied to control the light output at different locations in backlight 32.

Where a component (e.g. an optical component, light source, backlight, assembly, device, circuit, etc.) is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

Backlight 32 may comprise emitters of white light (such as, for example, white LEDs) or may comprise separate emitters of light having each of a plurality of spectral characteristics that collectively span a color space of interest. For example, backlight 32 may comprise separately-controllable emitters of red, green and blue light.

Monochrome displays may comprise a layer 10 as described herein.

Figure 7:
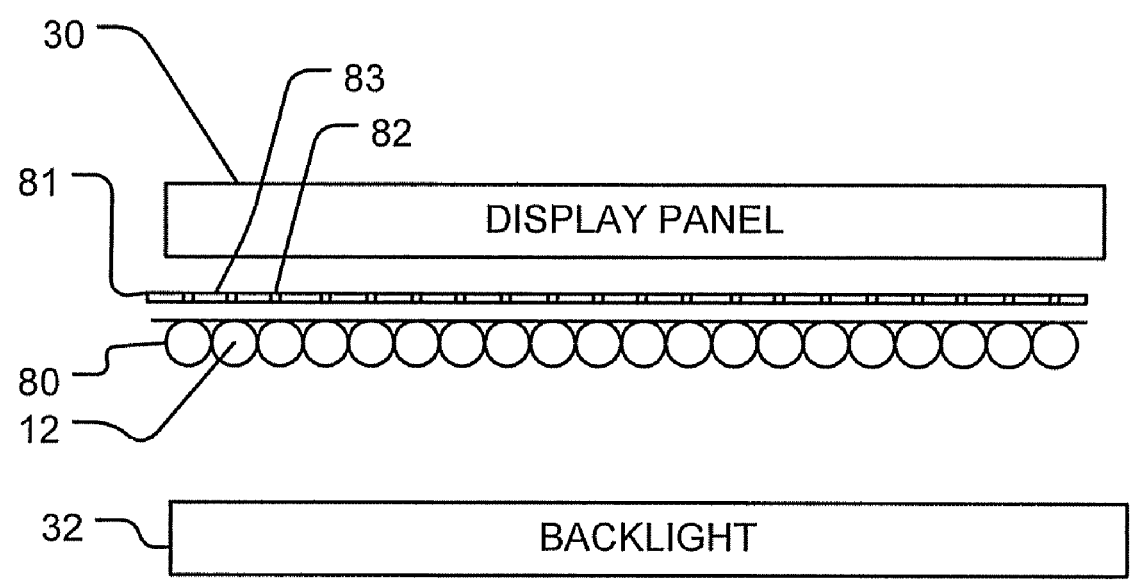
FIG. 7 is a schematic view of a display according to an alternative embodiment of the invention.

In a display, the components of layer 10 may be provided in multiple layers. For example, FIG. 7 shows a display 79 wherein lenses 12 are arranged in a first layer 80 and areas 20 are in the form of small apertures 82 arranged in a second layer 81 comprising a film having a reflecting face 83. Apertures 43 are registered with lenses 12. Apertures 43 may comprise openings in second layer or areas where layer 81 transmits light (e.g. areas where a mirror layer on layer 81 is absent). In some such embodiments, each lens 12 may be aligned to receive light primarily from one specific LED or other light-emitter of backlight 32.

Accordingly, the scope of the invention is to be construed in accordance with the substance defined by the following claims.

What is claimed is:

1. A display comprising:
   a backlight comprising a plurality of individually-controllable light emitters;
   a light modulator comprising a plurality of individually-controllable elements; and
   a retro-reflective optical layer positioned between the backlight and the light modulator, the retro-reflective optical layer configured to pass light incident thereon at an angle with respect to a normal to the retro-reflective optical layer of less than a threshold angle φ, and reflect light incident thereon at an angle with respect to a normal to the retro-reflective optical layer of greater than φ in a direction opposite and generally parallel to an incoming direction of incident light.

2. A display according to claim 1 wherein the retro-reflective optical layer comprises:
   a single-layer array of lenses;
   a front side defining optically-transmissive apertures on-axis with the lenses;
   a rear side on which the lenses are exposed to receive incident light; and,
   light-reflecting zones located off-axis and adjacent the lenses, the light-reflecting zones configured to reflect light incident thereon back into the lenses.

3. A display according to claim 2 wherein the light-reflecting zones comprise specular reflectors.

4. A display according to claim 2 wherein the light-reflecting zones comprise zones wherein an optical reflector is disposed on an outer surface of the lenses.

5. A display according to claim 4 wherein the lenses are supported by a matrix and the optical reflector comprises material of the matrix.

6. A display according to claim 5 wherein the material of the matrix is substantially specularly reflective.

7. A display according to claim 4 wherein the optical reflector comprises a substantially specularly reflective material applied to the outer surface of the lens.

8. A display according to claim 4 wherein the lenses are supported by a matrix and the optical reflector comprises a substantially specularly reflective material applied to matrix adjacent to the outer surface of the lens.

9. A display according to claim 2 wherein the lenses are at least partially embedded in a matrix and the optically-transmissive apertures comprise locations where the lenses project from the matrix on the front side of the layer.

10. A display according to claim 9 wherein the lenses are spheroidal and project from the matrix on the front side of the layer by a distance that is in the range of 5 to 20% of a diameter of the lenses.

11. A display according to claim 1 wherein $\phi$ is in the range of 15 to 20 degrees.

12. A display according to claim 1 wherein $\phi$ is less than or equal to a collimation angle of the individually-controllable light emitters.

13. A display according to claim 1 wherein a first distance between the backlight and the retro-reflective optical layer is greater than a second distance between the retro-reflective layer and the light modulator.

14. A display according to claim 13 wherein the first distance is at least two orders of magnitude greater than the second distance.

15. A display according to claim 1 wherein the backlight comprises a reflective back plate behind the light-emitters.

16. A display according to claim 15 wherein the back plate comprises a planar reflector.

17. A display according to claim 15 wherein the back plate is diffusely reflective.

18. A display according to claim 15 wherein the back plate comprises ridges that extend around the light emitters.

19. A display according to claim 15 wherein the light emitters are located in shallow depressions in the back plate.

20. A display according to claim 1 wherein the light emitters are configured to preferentially emit light in a range of angles at which light can pass through the retro-reflective optical layer.

21. A display according to claim 20 wherein at least a portion of the light emitters are configured to emit light preferentially in a cone with a half angle of less than 20 degrees.

22. A display according to claim 1 wherein the light emitters comprise side-emitting LEDs having a batwing emission profile coupled with a forward light-guiding system.

23. A display according to claim 1 wherein the backlight comprises parabolic reflectors configured to collimate and direct emitted light toward the retro-reflective optical layer.

24. A retro-reflecting optical layer comprising:
a single-layer array of lenses;
a front side defining optically-transmissive apertures on-axis with the lenses;
a rear side on which the lenses are exposed to receive incident light; and,
light-reflecting zones located off-axis and adjacent the lenses, the light-reflecting zones configured to reflect light incident thereon back into the lenses,
wherein the lenses are configured such that light reflected back into the lenses from the light-reflecting zones exits the lenses in a direction opposite and generally parallel to an incoming direction of incident light.

25. An optical layer according to claim 24 wherein the light-reflecting zones comprise specular reflectors.

26. An optical layer according to claim 24 wherein the light-reflecting zones comprise zones wherein an optical reflector is disposed on an outer surface of the lenses.

27. An optical layer according to claim 26 wherein the lenses are supported by a matrix and the optical reflector comprises material of the matrix.

28. An optical layer according to claim 27 wherein the material of the matrix is substantially specularly reflective.

29. An optical layer according to claim 26 wherein the optical reflector comprises a substantially specularly reflective material applied to the outer surface of the lens.

30. An optical layer according to claim 26 wherein the optical reflector comprises a substantially specularly reflective material applied to matrix adjacent to the outer surface of the lens.

31. An optical layer according to claim 24 wherein the lenses are spheroidal.

32. An optical layer according to claim 31 wherein the lenses have diameters of 50 μm or less.

33. An optical layer according to claim 24 wherein the lenses are at least partly embedded in a matrix and the optically-transmissive apertures comprise locations where the lenses project from the matrix on the front side of the layer.

34. An optical layer according to claim 33 wherein the lenses are spheroidal and project from the matrix on the front side of the layer by a distance that is in the range of 5 to 20% of a diameter of the lenses.

35. An optical layer according to claim 24 wherein a ratio of a combined area of exposed lenses on the rear side to a combined area of the optically-transmissive apertures is at least 4:1.

36. An optical layer according to claim 24 wherein, outside of the optically-transmissive apertures, the front side is light-reflective.

37. An optical layer according to claim 24 wherein areas on the rear side of the layer between the lenses are light-reflecting.

38. An optical layer according to claim 24 wherein $\phi$ is in the range of 15 to 25 degrees.

39. An optical layer according to claim 24 wherein $\phi$ is less than or equal to a collimation angle of light sources illuminating the rear side.

40. An optical layer according to claim 24 comprising a reflective layer on the front side, the reflective layer providing a reflective front-facing surface and contacting the lenses to provide the light-reflecting zones.

* * * * *